J. BOYCE.
HYDROGENATION OF FATTY SUBSTANCES.
APPLICATION FILED MAR. 7, 1912.

1,291,384.

Patented Jan. 14, 1919.
2 SHEETS—SHEET 1.

WITNESSES:

INVENTOR:
James Boyce,
BY
ATTORNEYS

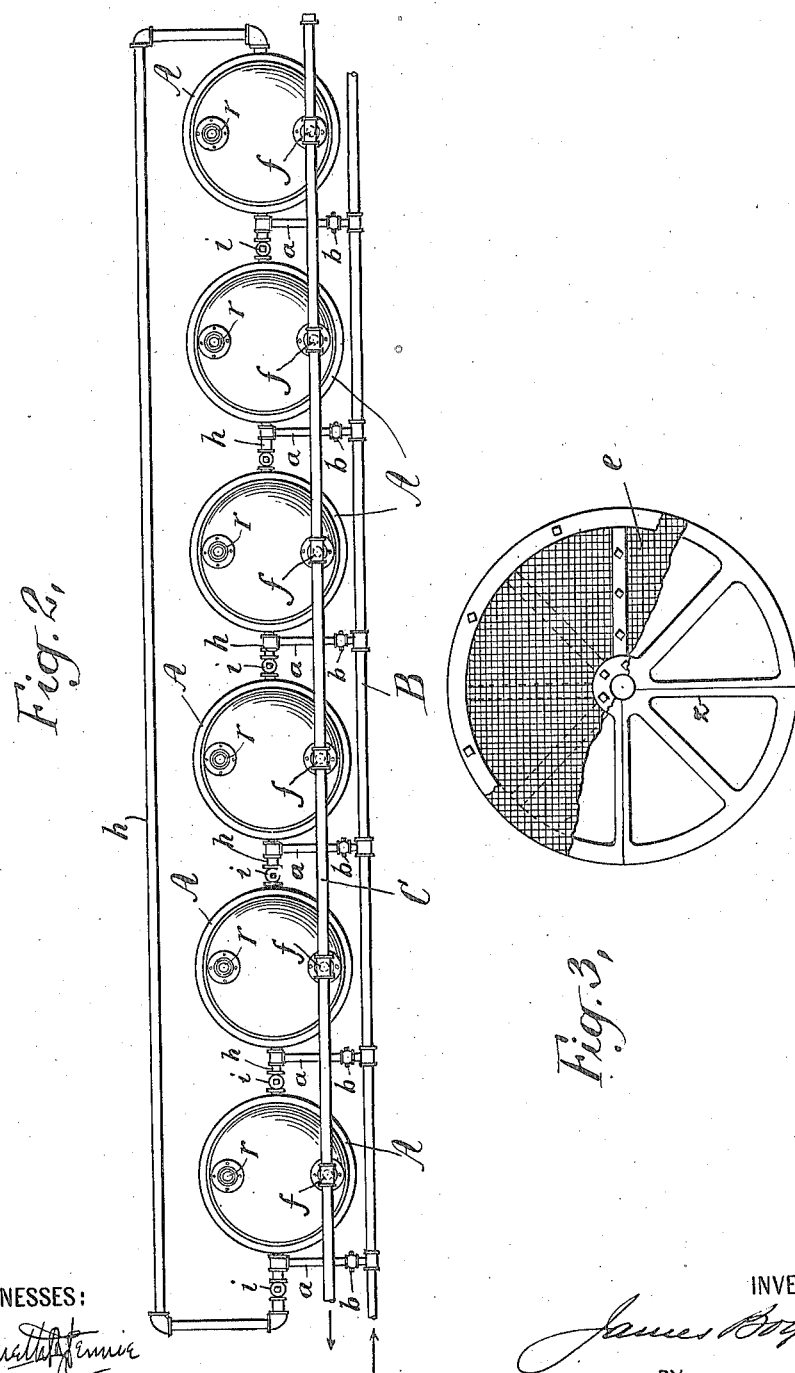

UNITED STATES PATENT OFFICE.

JAMES BOYCE, OF CHICAGO, ILLINOIS, ASSIGNOR TO AMERICAN COTTON OIL COMPANY, OF GUTTENBERG, NEW JERSEY, A CORPORATION OF NEW JERSEY.

HYDROGENATION OF FATTY SUBSTANCES.

1,291,384.

Specification of Letters Patent. Patented Jan. 14, 1919.

Application filed March 7, 1912. Serial No. 682,162.

*To all whom it may concern:*

Be it known that I, JAMES BOYCE, a citizen of the United States, and resident of Chicago, county of Cook, State of Illinois, have invented certain new and useful Improvements in the Hydrogenation of Fatty Substances; and I do hereby declare the following to be a full, clear, and exact description of the invention, such as will enable others skilled in the art to which it appertains to make and use the same.

My present invention relates to a method of hydrogenizing unsaturated fatty acids or their glycerids by means of hydrogen in the presence of finely divided catalytic material, my object being to produce a high grade product; to operate efficiently, economically and rapidly; to maintain the catalyzer in effective condition during a long period of use; to safeguard the operation against the danger of explosion; and to utilize the hydrogen continuously as it is produced in spite of local interruptions of the process, such as are required for changing and removing the material to be treated, thereby avoiding the need of storing amounts of hydrogen in tanks or gasometers.

My invention involves the introduction of a stream of hydrogen into the material to be treated containing the finely divided catalyzer. The material may be herein referred to as oil, since an oil, such as cotton-seed oil, is representative of such materials.

First: I provide means for thoroughly subdividing or atomizing the hydrogen before it passes up into the main body of the oil, which is in the form of a deep pool or column, and for distributing the hydrogen, so atomized, over the entire cross-sectional area of the column at the bottom thereof, whereby the hydrogen may permeate all parts of the column, rising up through it in a finely divided and thoroughly distributed condition.

Second: To facilitate and render more effective the aforesaid permeation of the oil by the hydrogen, and also to secure other results hereinafter referred to, I maintain a partial vacuum in the tank or vessel in which the operation takes place, which largely reduces the pressure on the entering gas bubbles and increases their expanding tendency besides tending to prevent the escape of hydrogen from the tank and the consequent danger of explosion in the room in which it is located.

Third: I also provide a series of tanks operating in succession, with means for applying the vacuum suction to anyone of the series while it is in communication with a previous tank, whereby any surplus or overflow of hydrogen from one tank may be drawn into and used in a succeeding tank. By this means, the hydrogen may be constantly produced and constantly used as it is produced, without resort to the storage of a quantity of hydrogen in a tank or gasholder.

Fourth: I also both draw off from and introduce the charge of oil to a tank, while it is still under vacuum, whereby the hot fat is prevented from becoming rancid by oxidation, and the catalyzer from being "poisoned" which would tend to reduce its efficiency and shorten its life.

Fifth: The catalyzer, which is mingled with the oil in a finely divided condition, I permit to settle out therefrom by gravity, by permitting the oil to stand for the required time after the desired hydrogenation has been effected. It thus settles out in the same vessel or receiver in which the hydrogenizing operation is taking place. After it has settled out to the bottom of the receiver, the oil may be removed and the catalyzer left behind in the receiver ready for use with a succeeding charge of oil, and it may thus be used many times before being replaced by a fresh supply. A minute and negligible amount of the catalyzer, such as may cling to the sides of the tank or may settle upon the cooling coil, might be drawn off with the oil, but it can readily be separated therefrom by well known clarifying means.

I prefer to use nickel for the catalyzer, the same being deposited on pumice stone, in any of the well-known ways, the pumice stone being first crushed into fine particles, each of which will form a small core of hard stone coated with a surface of nickel. This will expose a large surface area of catalytic metal to the oil, and the catalyzer will settle out from the oil clearly and in a short time.

In the accompanying drawings—

Fig. 2 represents a top plan view thereof; and

Fig. 3 represents, on a somewhat larger scale, a cross-sectional view, partly broken away, on the line 3—3 of Fig. 1.

Similar letters of reference indicate similar parts throughout the several views.

Figure 1:
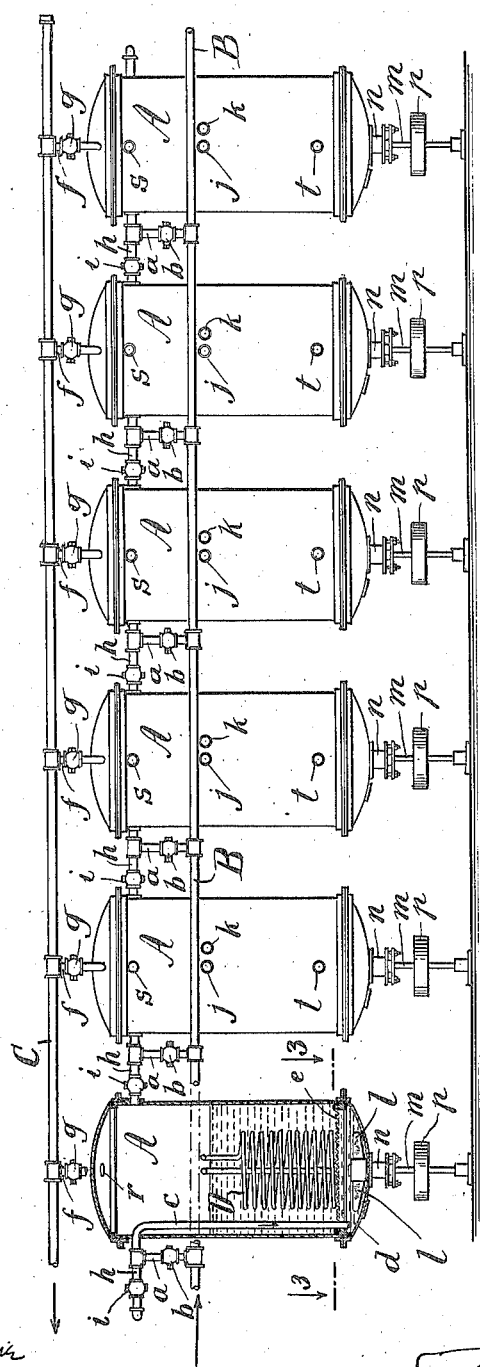
Figure 1 represents a front elevation, partly in section, of suitable apparatus for the practice of the invention.

I. In carrying out the first part of my invention, I employ a wire screen, located near the bottom of the column of oil and of an area substantially equal to the cross section of the column. This screen is shown at $e$ in the accompany drawing as supported by a spider $z$ (Fig. 3) which, in turn, rests upon a suitable angle iron or other support on the interior wall of tank A. The hydrogen is admitted below this screen into a space $d$ by a pipe $c$, and hydrogen-distributing fan-blades $l$ are mounted below the screen on a vertical shaft $m$, which passes through a suitable stuffing box $n$ and which is adapted to be rotated by a driving pulley $p$ or other suitable source of power.

The hydrogen emerges from the pipe $c$ in large bubbles which are immediately caught by the slowly revolving fan-blades and thereby swept across the under side of the screen and broken up by the screen into a multitude of fine bubbles which pass upward therethrough. Thus the hydrogen becomes distributed over the cross-sectional area of the column and at the same time is finely subdivided or atomized. It then rises up from the screen through all parts of the column uniformly and in a thoroughly subdivided condition. While this resultant effect is comparable broadly to that of an ordinary "manifold" of perforated pipe, such as is frequently used for distributing and subdividing gases employed for the treatment of liquid, yet my device has this improved characteristic that the gas instead of issuing from the perforations of a manifold, which are spaced at definite intervals apart, rises from the upper surface of the screen as a mass of fine bubbles more thoroughly and more uniformly distributed over the cross-section of the column into which they rise.

II. The second feature of my invention is carried out by maintaining a partial vacuum in the tank A above the oil column, that portion of the tank being connected with the vacuum main C by means of a branch pipe $f$ containing a cock $g$. So long as the hydrogenizing operation is in progress, this vacuum is maintained by the suction of branch pipe $f$, or, after hydrogen is in excess, by suction through a succeeding tank. I preferably employ a vacuum of about 5 or 6 inches of mercury and introduce the hydrogen under a slight pressure,—about 10 inches of water. This will about neutralize the weight of an oil column of 84 inches, while the gas bubbles, being relieved of the air pressure in the space above the oil column, will expand freely as they enter and pass through the oil. This also promotes the complete exposure of the oil to the hydrogen.

III. For the third feature of my invention, I provide a series of tanks A, six being shown in the drawing, each one of which has an individual branch pipe $f$ with a cock $g$ therein connecting it with the exhaust main C. The tanks are also connected together *seriatim* in a circuit by pipes $h$, each containing a cock $i$, one end of each pipe $h$ communicating with the interior space above the oil, of one tank and its other end communicating with the gas-inflow pipe $c$ of the next succeeding tank in the series. Each pipe $h$ has also a connection with the gas supply main B by means of a pipe $a$ containing a cock $b$, whereby the hydrogen supply for each tank may be drawn either directly from main B through pipes $a$ and $h$, or from the next preceding tank in the series through pipe $h$. Oil is introduced into each tank A through an inlet $s$ and withdrawn through an outlet $t$ at the bottom just above screen $e$.

In the arrangement, any tank of the series may be considered as the starting point of the operation, being first charged about to the level indicated in the first tank at the left of Fig. 1, by pumping in oil through inlet $s$. The oil will also contain the finely subdivided catalyzer, which is preferably introduced therein after first having been mixed with a small quantity of oil. The gas, admitted by the pipe $c$ to the tank so charged, will be distributed and atomized, in the manner above described, by the fan-blades $l$ and the screen $e$, and, passing up through the oil will be at first completely absorbed therein, any watery vapors or volatile impurities that are given off being conveyed away by the exhaust. When, however, the gas begins to come off the top of the column, the vacuum suction, which up to that point has been maintained through the branch pipe $f$ at the top of the first tank, is transferred to the second tank, which has been likewise charged with oil and catalyzer and put into communication, by pipe $h$, with the first tank. Then the surplus or overflow hydrogen from the first tank will be drawn into the second tank and there utilized as in the first one.

The vacuum will be maintained in both tanks at the same point—say 5 to 6 inches of mercury, the suction at the second one being at 10 to 12 inches of mercury to produce the five-inch to six-inch vacuum in both tanks, and so on through the series. In the same way, three or more tanks can be in operation simultaneously but at different stages of progress of the operation and when the hydrogenizing in the first tank is completed, it can be cut out from the series for the purpose of drawing off therefrom the treated oil and for the introduction of a fresh charge, though it is still maintained under vacuum, as will be hereinafter described. By this means, I am enabled to continuously make use of the hydrogen as it is produced, that portion which is in excess at one tank being taken over into the succeeding tank or tanks. This avoids the necessity of storing the hydrogen in quantity either before or after it passes through a tank. This is of special importance when the process is carried on in a city or town where the storing of hydrogen is prohibited by law. Practically, my process goes on continuously, each tank being recharged, after the oil therein has been treated and drawn off, and it will then become a succeeding tank with respect to those wherein the hydrogenizing is still in progress. For convenience of explanation, however, I have considered the first starting up of the operation, beginning at some one tank which I have referred to as the first one.

IV. The fourth feature of my invention involves the drawing off of the oil, after the hydrogenizing is finished, while the tank is still under vacuum, and the subsequent recharging while the vacuum is still maintained. A pump (not shown) will be connected to the oil outlet $t$, and the oil pumped out, while the vacuum suction is continued through pipe $f$, the tank being cut off from the others of the series by closing cocks $i$ and $b$, while cock $g$ in the vacuum pipe $c$ is opened. The outlet $t$ is located near the bottom of the tank just above the screen $e$, so that practically all of the oil will be drawn off, leaving only a small amount in the space $d$ under the screen with the catalyzer, which has been allowed to settle out of the oil after the hydrogenizing is finished and before the oil is drawn off. After the oil is withdrawn, (the catalyzer still remaining in the tank to be used again and repeatedly as many times as it will serve before being replaced,) the outlet $t$ is closed, and, while the vacuum is still maintained, the fresh charge of oil is introduced through the inlet $s$ and the described operation repeated. By this means I preserve the quality of the product, since it is not subjected to the oxidizing effect of the air which would tend to make it rancid, particularly the thin films of oil clinging to the walls of the tank and on the cooling coil. It also preserves the quality of the catalyzer which thus cannot become "poisoned" by contact with the air.

V. The sixth feature of my invention resides in the maintaining of the catalyzer continuously in the tank or vessel wherein the hydrogenizing takes place, by allowing it to settle down in the bottom of that tank or vessel by gravity before the saturated oil is drawn off. This is in contrast to the drawing off of the catalyzer with the oil and the subsequent separating of it from the oil by a filter-press or other process. In furtherance of this end, I find it of advantage to deposit the catalytic metal, preferably nickel, on pumice stone. Since the depositing of a nickel catalyzer on pumice stone is not new, I do not prescribe any particular method therefor. A catalyzer thus deposited on pumice stone will settle out completely and in a short time from a body of oil and collect at the bottom of the tank. I may add that the coating of a hard body such as pumice stone with the catalytic metal exposes an increased surface of contact to the hydrogen and oil, the action depending on the "well-known "contact" principle of an adequate exposure of the oil to the hydrogen and to the surface of the catalytic material.

Having thus described my invention what I claim is:

1. The method of subjecting a liquid column of fatty substances, in the presence of a catalyzing agent, to the action of hydrogen gas, which consists in distributing the gas at the bottom of the column in a space provided for that purpose and breaking up the gas thus distributed into still more uniformly distributed bubbles as it rises from said space into the main body-portion of the column above; substantially as described.

2. The method of hydrogenizing fatty substances, which consists in passing upwardly into a liquid column thereof, in which a catalyzing agent is contained, a substantially equally distributed multitude of comminuted hydrogen gas bubbles; substantially as described.

3. The method of hydrogenizing fatty substances which consists in introducing the hydrogen to the bottom of a liquid column of the material to be treated containing a catalyzing agent, and mechanically distributing and subdividing the gas over the cross-sectional area of the column, whereby the gas will rise up through all parts of the column in a finely subdivided condition; substantially as described.

4. In a hydrogenation of a liquid column of fatty substances, the method of distributing the gas over the cross-sectional area of the column before passing it upwardly therethrough, which consists in dividing off the lower portion of the column from the main body by a screen, admitting the hydrogen below the screen and carrying the hydrogen around in said lower portion thereby subdividing it therein into a multitude of small bubbles; substantially as described.

5. The method of hydrogenizing fatty substances which consists in passing hydrogen gas into a liquid column thereof in which a catalyzing agent is contained while maintaining the treated liquid under exhaust; substantially as described.

6. The method of hydrogenizing fatty substances, which consists in passing upwardly into a liquid column thereof, in which a catalyzing agent is contained, a substantially equally distributed multitude of hydrogen gas bubbles, and maintaining the treated liquid under exhaust so as to cause a greater expansion of the bubbles on their passage upward; substantially as described.

7. The method of hydrogenizing fatty substances, which consists in passing hydrogen gas into a liquid charge thereof, in which a catalyzing agent is contained, while maintaining the liquid charge treated under exhaust, and, after the liquid charge begins to give off unabsorbed or surplus hydrogen, passing said surplus into a second liquid charge under exhaust; substantially as described.

8. The method of hydrogenizing fatty substances, which consists in arranging in sequence a plurality of individual liquid charges thereof, each liquid charge containing a catalyzing agent, passing freshly generated hydrogen gas into one of said liquid charges, and passing the unabsorbed or surplus gas therefrom into a succeeding liquid charge of the series, until the desired hydrogenation of the initial liquid charge has been effected, such surplus gas being absorbed in the series; substantially as described.

9. The method of hydrogenizing fatty substances, which consists in continuously producing a supply of hydrogen and continuously consuming the same in a series of individual charges of the substances to be treated, by periodically connecting to the series a fresh charge containing a catalyzing agent to receive the surplus hydrogen from a previously connected charge, and periodically removing from the series a charge wherein the desired hydrogenation has been completed, whereby the storage of hydrogen may be avoided; substantially as described.

10. The method of hydrogenizing successive liquid charges of fatty substances in the same receptacle, which consists in passing hydrogen gas through an initial charge in which a catalyzing agent is contained, removing the charge so treated, and admitting the next succeeding charge, while excluding air from the treating receptacle; substantially as described.

11. The method of hydrogenizing successive liquid charges of fatty substances in the same receptacle, which consists in passing hydrogen gas through an initial charge containing a divided catalyzer, separating the catalyzer from the substance within said receptacle, removing the substance from the receptacle, leaving the catalyzer therein, and recharging the receptacle, air being excluded from the receptacle during each of the aforesaid steps; substantially as described.

12. The method of treating successive charges of fatty substances in the same receptacle, which consists in passing hydrogen gas through an initial charge in the presence of a catalyzing agent, permitting the catalyzing agent to settle out of the charge after the desired hydrogenation thereof has been effected, drawing off the substantially clear portion of the charge, and then admitting into the receptacle a succeeding charge for like hydrogenation; substantially as described.

13. The method of hydrogenizing a fatty substance, which consists in mingling with it a finely divided catalyzer and subjecting the mixture to the action of hydrogen until the desired hydrogenation is effected, and then separating the catalyzer from the substance in a receiver from which air is excluded; substantially as described.

14. The method of hydrogenizing a fatty substance, which consists in mingling with it a finely divided catalyzer and subjecting the mixture to the action of hydrogen until the desired hydrogenation is effected, settling out the catalyzer by gravity in the receptacle in which the hydrogenation was effected, and removing the substance from said receptacle leaving the catalyzer therein; substantially as described.

In testimony whereof I affix my signature, in presence of two witnesses.

JAMES BOYCE.

Witnesses:
 JOHN C. PENNIE,
 MINERVA LOBEL.